US009684665B2

(12) United States Patent
Ohno

(10) Patent No.: US 9,684,665 B2
(45) Date of Patent: Jun. 20, 2017

(54) STORAGE APPARATUS AND DATA COMPRESSION METHOD

(71) Applicant: FUJITSU LIMITED, Kawasaki-shi, Kanagawa (JP)

(72) Inventor: Yoshinari Ohno, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 217 days.

(21) Appl. No.: 14/098,658

(22) Filed: Dec. 6, 2013

(65) Prior Publication Data
US 2014/0201175 A1    Jul. 17, 2014

(30) Foreign Application Priority Data
Jan. 11, 2013    (JP) ................................ 2013-003910

(51) Int. Cl.
*G06F 7/00*     (2006.01)
*G06F 17/00*    (2006.01)
*G06F 17/30*    (2006.01)

(52) U.S. Cl.
CPC ............... *G06F 17/30153* (2013.01)

(58) Field of Classification Search
CPC ......... G06F 17/30129; G06F 17/30324; G06F 17/30144; G06F 17/30286; G06F 17/30153; G06F 17/30575
See application file for complete search history.

(56) References Cited

U.S. PATENT DOCUMENTS

| 7,873,782 B2 * | 1/2011 | Terry | ................... G06F 3/0607 707/823 |
| 7,952,499 B1 * | 5/2011 | Crivat | ..................... H03M 7/46 341/50 |

(Continued)

FOREIGN PATENT DOCUMENTS

| JP | 06-324925 | 11/1994 |
| JP | 2000-29756 A | 1/2000 |

(Continued)

OTHER PUBLICATIONS

Japanese Office Action mailed Jul. 5, 2016 for corresponding Japanese Patent Application No. 2013-003910, with Partial English Translation, 8 pages.

*Primary Examiner* — Susan Chen
(74) *Attorney, Agent, or Firm* — Fujitsu Patent Center

(57) ABSTRACT

A storage apparatus includes a data storage unit, management information storage unit, compression judgment unit, and compression control unit. The data storage unit stores the data of files. The management information storage unit stores management information on the files. The compression judgment unit evaluates compression effectiveness for a file at prescribed execution timing and determines whether the compression of the file is appropriate or not. The compression control unit updates the management information so as to reflect the determination result obtained by the compression judgment unit, and then stores the compressed data of the file in a compressed format in the data storage unit if the determination result indicates that the compression is appropriate, and stores the uncompressed data of the file in an uncompressed format in the data storage unit if the determination result indicates the compression is inappropriate.

10 Claims, 10 Drawing Sheets

(56) References Cited

U.S. PATENT DOCUMENTS

| | | | | |
|---|---|---|---|---|
| 2002/0178403 | A1* | 11/2002 | Floyd | G06F 11/348 714/39 |
| 2003/0041095 | A1* | 2/2003 | Konda | G06F 17/30569 709/201 |
| 2003/0058873 | A1* | 3/2003 | Geiger | H04L 49/351 370/401 |
| 2003/0224734 | A1 | 12/2003 | Takekawa et al. | |
| 2005/0219076 | A1* | 10/2005 | Harris | G06F 17/30067 341/51 |
| 2006/0010230 | A1* | 1/2006 | Karklins | G05B 19/05 709/223 |
| 2006/0161646 | A1* | 7/2006 | Chene | G06F 17/243 709/223 |
| 2007/0271046 | A1* | 11/2007 | Agarwala | G06F 11/3632 702/57 |
| 2008/0240226 | A1* | 10/2008 | Okmianski | H04L 41/0843 375/240 |
| 2012/0102005 | A1* | 4/2012 | Kamei | G06F 3/0608 707/693 |
| 2012/0254207 | A1* | 10/2012 | Bath | G06F 17/3015 707/758 |
| 2012/0330567 | A1* | 12/2012 | Bauer | G06F 19/22 702/20 |
| 2013/0234868 | A1* | 9/2013 | Koth | G08G 1/123 340/994 |

FOREIGN PATENT DOCUMENTS

| | | |
|---|---|---|
| JP | 2000-358144 | 12/2000 |
| JP | 2002-49512 A | 2/2002 |
| JP | 2003-338761 | 11/2003 |
| JP | 2008-129678 A | 6/2008 |

* cited by examiner

100 FILE MANAGEMENT TABLE

| ITEMS | STORED INFORMATION |
|---|---|
| CREATION TIMESTAMP | DATE AND TIME |
| LAST UPDATE TIMESTAMP | DATE AND TIME |
| SIZE | VOLUME |
| ... | ... |
| COMPRESSION STATE | COMPRESSED/UNCOMPRESSED |
| UPDATE COUNT FOR UNCOMPRESSED STATE | THE NUMBER OF TIMES |
| LAST COMPRESSION JUDGMENT TIMESTAMP | DATE AND TIME |
| LAST COMPRESSION TIMESTAMP | DATE AND TIME |
| ... | ... |

FIG. 5

110 CONDITION TABLE

| ITEMS | STORED INFORMATION |
|---|---|
| UPDATE COUNT | NUMBER OF TIMES |
| ELAPSED TIME FROM LAST UPDATE | TIME PERIOD |
| FILE SIZE DIFFERENCE AFTER UPDATE | RATIO |
| DATA UPDATE AMOUNT | VOLUME |
| ELAPSED TIME FROM LAST COMPRESSION | TIME PERIOD |
| COMPRESSION RATIO | RATIO |
| ... | ... |

FIG. 9

STORAGE APPARATUS AND DATA COMPRESSION METHOD

CROSS-REFERENCE TO RELATED APPLICATION

This application is based upon and claims the benefit of priority of the prior Japanese Patent Application No. 2013-003910, filed on Jan. 11, 2013, the entire contents of which are incorporated herein by reference.

FIELD

The embodiments discussed herein relate to a storage apparatus and a data compression method.

BACKGROUND

With the recent positive introduction of virtual systems, cloud systems, and virtual desktops as a background, file servers (storage apparatuses) perform further data aggregation, and a demand for supporting more servers is increasing.

While handling increasing loads, the file servers are also demanded to improve the throughput to requests from servers. Therefore, the file servers are under a situation where they are not allowed to consume Central Processing Unit (CPU) resources (computing resources) wastefully.

In addition to this, the file servers are becoming more sophisticated. For example, a file server employs a data volume compression technique and a de-duplication technique of removing duplicate data, so as to efficiently store a large amount of data on storage media such as a Hard Disk Drive (HDD) and so on. The file server consumes the CPU resources for such processing.

In addition, since a price per data volume is considered as one of performance indexes, file servers that are capable of storing a large amount of data and are inexpensive are desired. That is to say, such file servers are desired that achieve both efficient data storage and a reduction in consumption of CPU resources for the efficient data storage.

For example, in order to achieve efficient data storage, a file server is provided with a function of compressing and storing data. The file server compresses and stores data in response to a write request, and decompresses (extracts) data in response to a read request and then makes a response.

Each time the file server is accessed from a server, the data compression function thereof compresses or decompresses data. Compared with the case of not using such a compression function, the file server consumes more CPU resources. However, with regard to data that has been subjected to sophisticated data compression (for example, image data such as jpeg), further compression of the data may have little compression effectiveness, or even increase the data size. Such cases end up consuming CPU resources wastefully.

To reduce the wasteful consumption of CPU resources, there are known techniques of compressing only designated directories and of determining based on the extensions of files whether to compress the files or not.

Please see, for example, Japanese Laid-open Patent Publications Nos. 2003-338761, 2000-358144, and 06-324925.

If it depends on a user to determine what are to be compressed, the user is demanded to make an appropriate decision about it. A user's inappropriate decision results in more inefficiency, and therefore an operational burden on the user is high.

In addition, considering the case where the decision is made based on the extensions of files, compression of files even with the same extension may produce different compression effectiveness, and therefore this may lead to inefficient compression depending on data. Further, if a file format is changed or another file format is added, an appropriate extension needs to be registered accordingly. This causes a problem that is the lack of ease of maintenance.

SUMMARY

According to one aspect, there is provided a storage apparatus including: a data storage unit configured to store data of a file; a management information storage unit configured to store management information on the file; a compression judgment unit configured to evaluate compression effectiveness for the file at prescribed execution timing and determine whether compression of the file is appropriate or not; and a compression control unit configured to update the management information so as to reflect a result of the determination, store compressed data of the file in a compressed format in the data storage unit when the result of the determination indicates that the compression of the file is appropriate, and store uncompressed data of the file in an uncompressed format in the data storage unit when the result of the determination indicates that the compression of the file is inappropriate.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 illustrates an example of a file management table according to the second embodiment;

FIG. 9 illustrates an example of a condition table according to the second embodiment.

DESCRIPTION OF EMBODIMENTS

Figure 1:
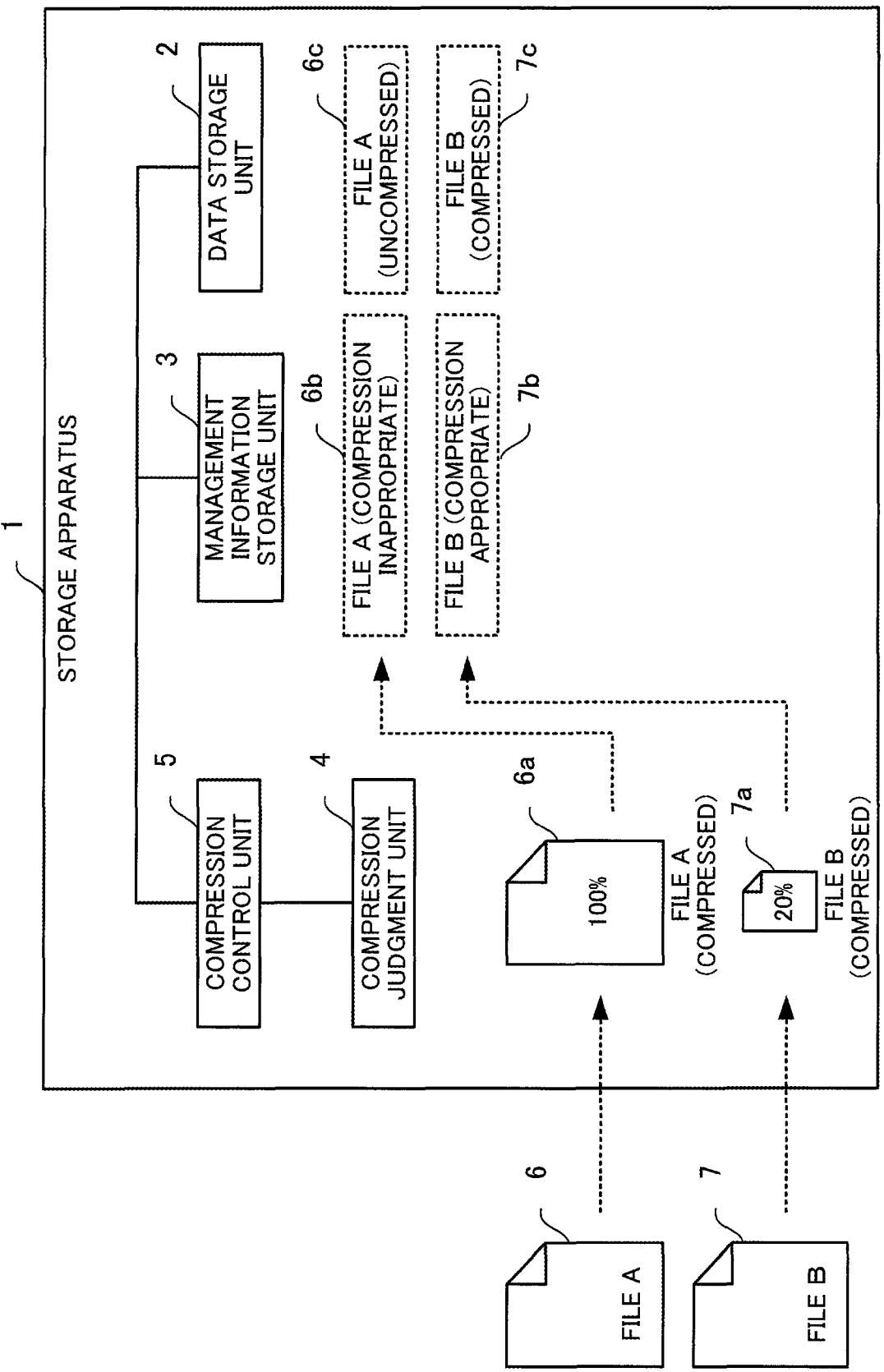
FIG. 1 illustrates an exemplary configuration of a storage apparatus according to a first embodiment.

Several embodiments will be described below with reference to the accompanying drawings, wherein like reference numerals refer to like elements throughout.

(a) First Embodiment

A storage apparatus according to a first embodiment will first be described with reference to FIG. 1. FIG. 1 illustrates an exemplary configuration of a storage apparatus according to the first embodiment.

A storage apparatus 1 is a control apparatus that controls access to physical resources (recording media) in which prescribed information is stored. The storage apparatus 1 functions as a file server for managing a file system. For example, the physical resources include HDDs, Solid State Drives (SSDs (flash memory drives)), and others. The physical resources may be a storage pool that is a collection of a plurality of HDDs and SSDs.

The storage apparatus 1 performs data volume compression in order to achieve efficient data storage in physical resources. The storage apparatus 1 consumes CPU resources to compress data to be written to the physical resources and to decompress data read from the physical resources. The storage apparatus 1 controls data compression, taking into account a balance between consumption of the CPU resources for compressing and decompressing data and the storage efficiency of the physical resources.

The storage apparatus 1 includes a data storage unit 2, management information storage unit 3, compression judgment unit 4, and compression control unit 5. The data storage unit 2 stores the data of files, and is a storage area of a physical resource. The management information storage unit 3 stores management information on the files, and is a storage area of a physical resource. The management information storage unit 3 may be a storage area within a working memory such as a Random Access Memory (RAM). The data of files is information to be stored, and the management information on the files is used for managing or controlling the data to be stored.

The compression judgment unit 4 evaluates the compression effectiveness for a file and determines whether the compression of the file is appropriate or not. At prescribed execution timing, the compression judgment unit 4 makes the determination. For example, the prescribed execution timing may be when a new file is written. The compression judgment unit 4 compresses a file to be written, and evaluates the compression effectiveness for the file to be written. For example, if a file A 6 is compressed to thereby produce a file A (compressed) 6a of the same size (100%) as the file A 6, the compression judgment unit 4 evaluates that the compression of the file is ineffective. On the other hand, if a file B 7 is compressed to thereby produce a file B (compressed) 7a having a 20% size of the file B 7, the compression judgment unit 4 evaluates that the compression of the file is effective.

In this connection, the compression effectiveness for a file may be evaluated under prescribed evaluation criteria. For example, the compression judgment unit 4 evaluates the compression effectiveness for a file in terms of a compressed file size, a compression ratio, or the like, and compares the evaluation result with a prescribed threshold to determine whether the compression of the file is appropriate or not. For example, the compression ratio of the size of the file A (compressed) 6a to the size of the file A 6 is 100%, which is not lower than a prescribed threshold of 100% (that is, the compression is ineffective). Therefore, the compression of the file A 6 is determined to be "inappropriate". On the other hand, the compression ratio of the size of the file B (compressed) 7a to the size of the file B 7 is 20%, which is lower than the predetermined threshold of 100% (that is, the compression is effective). Therefore, the compression of the file B 7 is determined to be "appropriate".

The compression control unit 5 records (updates) management information in the management information storage unit 3. The compression control unit 5 updates the management information to reflect a determination result obtained by the compression judgment unit 4. That is, the compression control unit 5 updates one piece of the management information which indicates whether the compression of a file is appropriate or not. If the compression judgment unit 4 obtains a determination result that the compression of a file is "appropriate", the compression control unit 5 stores the compressed data of the file in a compressed format in the data storage unit 2. If the compression judgment unit 4 obtains a determination result that the compression of a file is "inappropriate", the compression control unit 5 stores the uncompressed data of the file in an uncompressed format in the data storage unit 2.

For example, since the compression of the file A 6 is determined to be "inappropriate", the compression control unit 5 stores a file A (indicating compression inappropriate) 6b in the management information storage unit 3, and stores the file A (uncompressed) 6c in the data storage unit 2. On the other hand, since the compression of the file B 7 is determined to be "appropriate", the compression control unit 5 stores a file B (indicating compression appropriate) 7b in the management information storage unit 3, and stores the file B (compressed) 7c in the data storage unit 2.

The above technique enables the storage apparatus 1 to reduce the operational burden on users and achieve efficient data compression. In addition, the storage apparatus 1 does not compress or decompress a file if the compression of the file is evaluated to be ineffective, which reduces wasteful consumption of the computing resources that is for the compression and decompression of the file.

As a result, the storage apparatus 1 is able to achieve data compression with reducing the operational burden and using the computing resources efficiently.

(b) Second Embodiment

Figure 2:
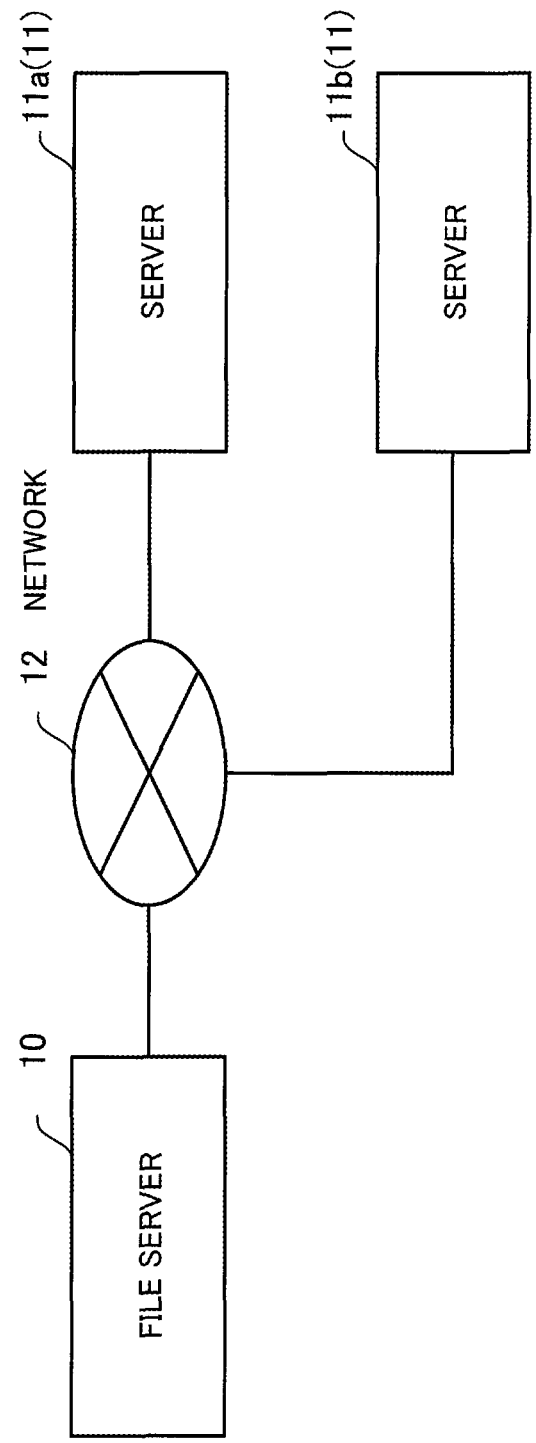
FIG. 2 illustrates an exemplary system connection of a file server according to a second embodiment.

The following describes a system provided with a file server of a second embodiment with reference to FIG. 2. FIG. 2 illustrates an exemplary system connection of a file server according to the second embodiment.

A file server 10 connects with and communicates with one or a plurality of servers 11 over a network 12. Referring to the exemplary connection of FIG. 2, the file server 10 connects with two servers 11a and 11b over the network 12. The network 12 is a Local Area Network (LAN), Wide Area Network (WAN), or the like.

The file server 10, network 12, and servers 11a and 11a form a file server system. The file server 10 provides a file service for the servers 11a and 11b. The file server 10 writes and reads data to and from storage according to write and read requests from the servers 11. The file server 10 supports the file service for a number of servers 11 through data aggregation, which contributes to realization of virtual systems, cloud systems, and virtual desktops.

The file server 10 is a storage apparatus with large-capacity storage (physical resources), and is, for example, a Network Attached Storage (NAS). The file server 10 manages a file system. The file server 10 creates the file system on Redundant Arrays of Inexpensive Disks (RAID) by combining a plurality of HDDs and SSDs, and performs RAID control and file system management. The file server 10 compresses and decompresses files for using the storage efficiently.

The following describes a hardware configuration of the file server of the second embodiment with reference to FIG.

Figure 3:
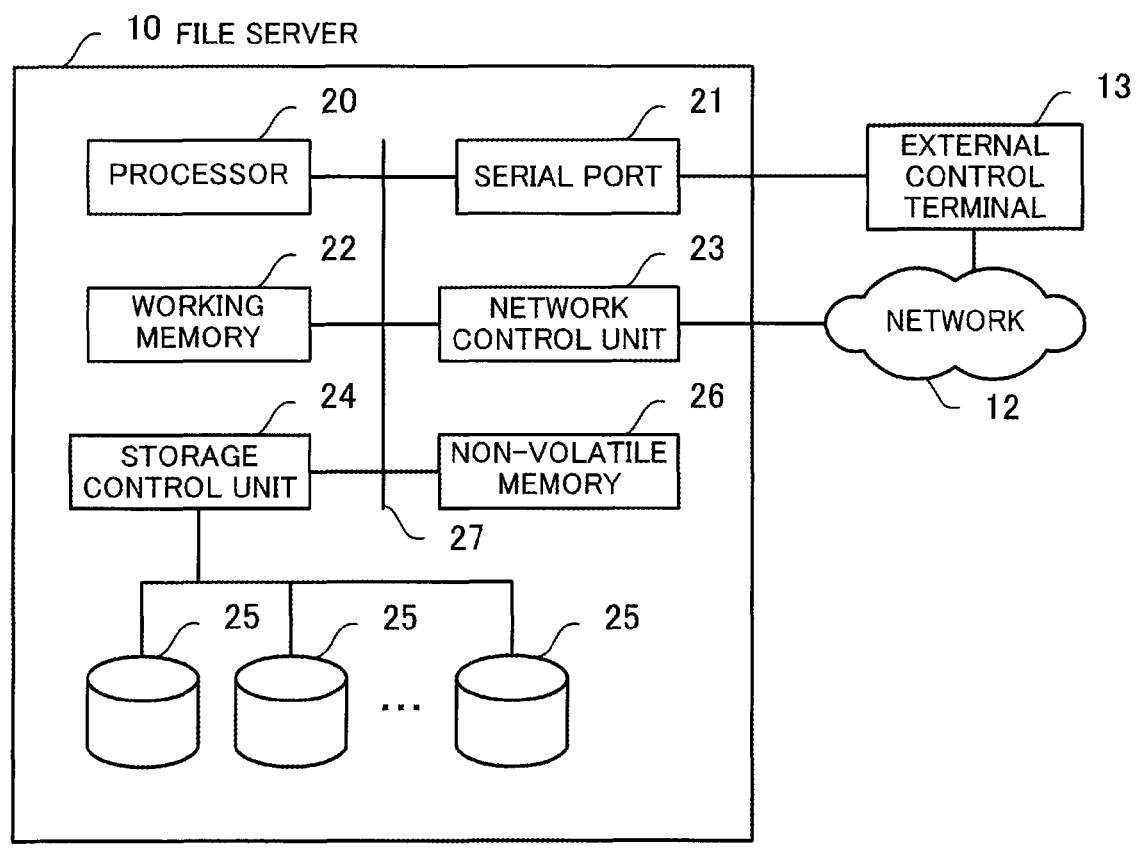
FIG. 3 illustrates an exemplary hardware configuration of a file server according to the second embodiment.

3. FIG. 3 illustrates an exemplary hardware configuration of a file server according to the second embodiment.

The file server 10 includes a processor 20, serial port 21, working memory 22, network control unit 23, storage control unit 24, storage 25, non-volatile memory 26, and bus 27. The file server 10 is entirely controlled by the processor 20. A plurality of peripheral devices is connected to the processor 20 via the bus 27. The processor 20 may be a multiprocessor. The processor 20 is, for example, a CPU, Micro Processing Unit (MPU), Digital Signal Processor (DSP), Application-Specific Integrated Circuit (ASIC), or Programmable Logic Device (PLD). Alternatively, the processor 20 may be a combination of two or more of the CPU, MPU, DSP, ASIC, and PLD.

The serial port 21 controls communications that are performed with an external control terminal 13 via the serial port. The network control unit 23 controls communications that are performed with the external control terminal 13 via a network port. The file server 10 is allowed to connect with and communicate with the external control terminal 13 using two routes via the serial port and the network port. The external control terminal 13 is used for performing maintenance on the file server 10, including settings and manipulation on the file server 10.

The storage control unit 24 controls one or a plurality of storage 25. The storage 25 is physical resources that are capable of storing data, and is storage devices such as HDDs, SSDs and the like. The storage 25 stores data on file systems, file management areas, and files.

The working memory 22 is, for example, a RAM, and is used as a primary storage device of the file server 10. The working memory 22 temporarily stores at least part of Operating System (OS) programs, application programs to be executed by the processor 20. The working memory 22 also stores various data to be used while the processor 20 operates. The working memory 22 functions as a buffer for holding both data read from the storage 25 and data to be written in the storage 25. The working memory 22 also stores file management information read from the storage 25.

The non-volatile memory 26 retains stored contents even if power interruption occurs in the file server 10. The non-volatile memory 26 is, for example, a semiconductor storage device, such as an Electrically Erasable Programmable Read-Only Memory (EEPROM) or a flash memory, HDD, or the like. The non-volatile memory 26 is used as a secondary storage device of the file server 10. The non-volatile memory 26 stores the OS programs, firmware, application programs, and various data.

In this connection, the file server 10 may be provided with a device connection interface (not illustrated) that is a communication interface for connecting peripheral devices to the file server 10. For example, a memory device or memory reader/writer may be connected to the device connection interface. The memory device is a recording medium having a function of communicating with the device connection interface. The memory reader/writer is a device for writing and reading data to and from a memory card. The memory card is a card recording medium.

The processing functions of the second embodiment are realized with the above-described hardware configuration. In this connection, the storage apparatus 1 of the first embodiment may be realized with the same hardware configuration as the file server 10.

The file server 10 realizes the processing functions of the second embodiment by executing a program recorded on, for example, a computer-readable recording medium. The program describing the contents of the processing to be performed by the file server 10 (computer) may be recorded on various types of recording media. For example, the program to be executed by the file server 10 may be stored on the non-volatile memory 26. The processor 20 loads at least part of the program from the non-volatile memory 26 to the working memory 22, and then executes the program. Alternatively, the program to be executed by the file server 10 may be recorded on a portable recording medium such as a memory device, memory card, or the like. The program recorded on the portable recording medium is made executable by being installed to the non-volatile memory 26, for example, under the control of the processor 20. Or the processor 20 may execute the program directly from the portable recording medium. Yet alternatively, the program to be executed by the file server 10 may be sent from an external device such as the external control terminal 13 connected so as to enable communications therewith. The program received from the external control terminal 13 is made executable by being installed to the non-volatile memory 26, for example, under the control of the processor 20.

Figure 4:
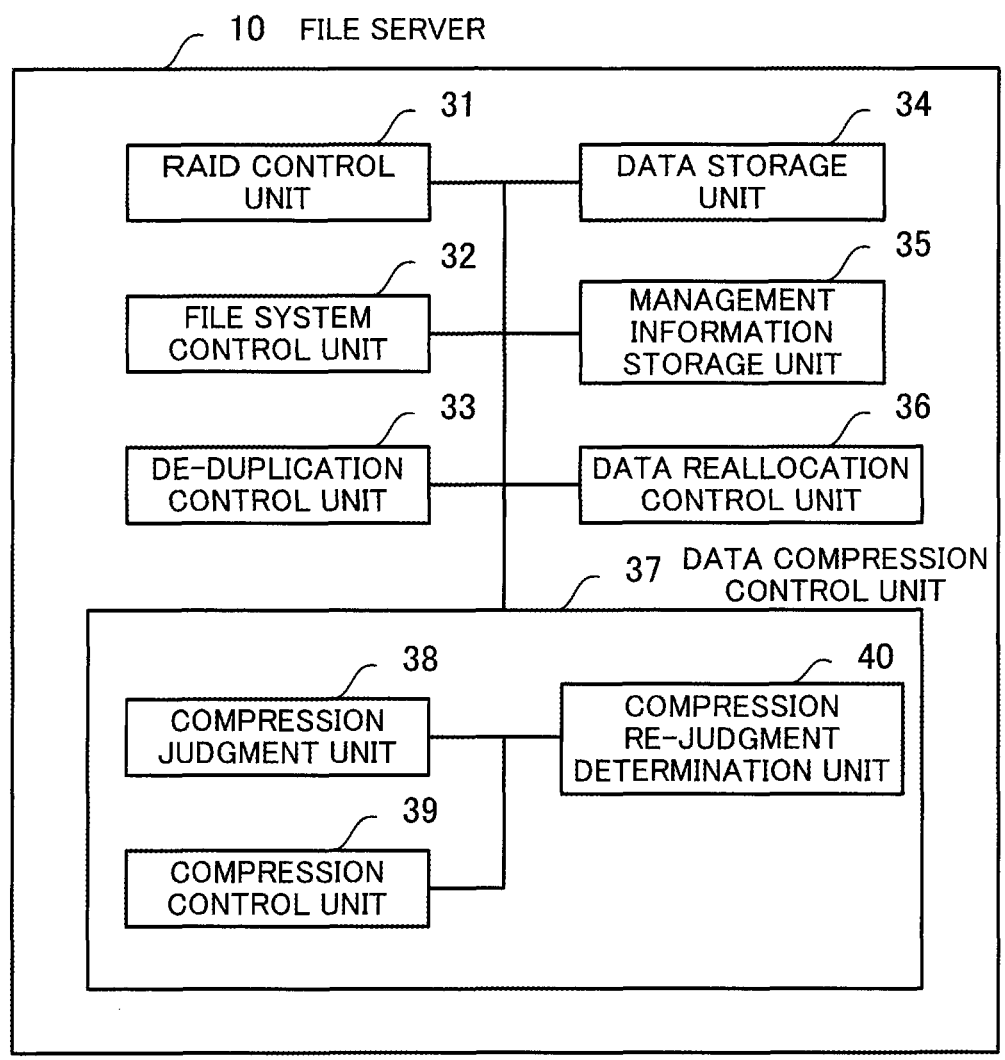
FIG. 4 is a block diagram illustrating an exemplary configuration of a file server according to the second embodiment.

The following describes the configuration of the file server according to the second embodiment, with reference to FIG. 4. FIG. 4 is a block diagram illustrating an exemplary configuration of a file server according to the second embodiment.

The file server 10 includes a RAID control unit 31, file system control unit 32, de-duplication control unit 33, data storage unit 34, management information storage unit 35, data reallocation control unit 36, and data compression control unit 37. The RAID control unit 31 controls a plurality of storage 25 as a RAID. The file system control unit 32 controls the file system. The de-duplication control unit 33 controls a de-duplication function of eliminating duplicate data in the storage 25. The data reallocation control unit 36 controls a data reallocation function of reallocating data in the storage 25. The data compression control unit 37 controls a data compression function of compressing and decompressing data in the storage 25.

The file server 10 stores, on the non-volatile memory 26, control procedures (programs) for the RAID control unit 31, file system control unit 32, de-duplication control unit 33, data reallocation control unit 36, and data compression control unit 37 to realize their intended processing functions. The file server 10 loads the control procedures from the non-volatile memory 26 to the working memory 22 according to necessity.

The data storage unit 34 stores data. The management information storage unit 35 stores management information. The data storage unit 34 is implemented by using, for example, the storage 25. The management information storage unit 35 is implemented by using the storage 25, or may be implemented by using the working memory 22 or non-volatile memory 26 if the management information is obtained and stored from the storage 25 on such a memory at the start-up of the file server 10.

The data compression control unit 37 includes a compression judgment unit 38, compression control unit 39, and compression re-judgment determination unit 40. The compression judgment unit 38 evaluates the compression effectiveness for a file at prescribed execution timing and determines whether the compression of the file is appropriate or not. The prescribed execution timing may be when a new file is written, when execution of compression re-judgment is determined by the compression re-judgment determination unit 40, or the like. The compression control unit 39 records (updates) management information in the management information storage unit 35. The compression control unit 39 updates the management information to reflect a determination result obtained by the compression judgment unit 38. If the compression judgment unit 38 obtains a determination result that the compression of a file is "appropriate", the compression control unit 39 stores the compressed data of the file in a compressed format in the data storage unit 34. If the compression judgment unit 38 obtains a determination result that the compression of the file is "inappropriate", the compression control unit 39 stores the uncompressed data of the file in an uncompressed format in the data storage unit 34.

The above technique enables the file server 10 to achieve efficient data compression with reducing the operational burden on users. In addition, the file server 10 does not compress or decompress a file if the compression of the file is evaluated to be ineffective, which reduces wasteful consumption of computing resources that is for the compression and decompression of the file.

As a result, the file server 10 is able to achieve data compression with reducing the operational burden and using computing resources efficiently.

The following describes a file management table of the second embodiment with reference to FIG. 5. FIG. 5 illustrates an example of a file management table according to the second embodiment.

In managing a file, the file system control unit 32 of the file server 10 separately manages an area for actual data and a management area for managing or controlling the data. As the management area and data area, an inode and data block, which are used in UNIX (trademark) file systems, are known.

The file system control unit 32 allocates at least one inode for a file to manage management information on the file. The file system control unit 32 is capable of confirming the management information about a file, including metadata, and the location of the data (the address of a data block) with reference to the inode. The file system control unit 32 manages the inode on the working memory 22 for convenience of file management.

An inode holds, as metadata, an inode number (identification information) identifying a file in the file system, file size, file timestamp, access authority, access attributes, etc. The file server 10 records the metadata of each file in the file management table 100. The file server 10 stores the file management table 100 in the working memory 22.

The file management table 100 contains, with respect to a file, creation timestamp, last update timestamp, size, compression state, update count for uncompressed state, last compression judgment timestamp, and last compression timestamp. The creation timestamp indicates when the file was created. The last update timestamp indicates when the file was updated last time. The size indicates the size (volume) of the file. The compression state indicates whether the file is compressed or not, and contains "compressed" to indicate that the file is compressed or "uncompressed" to indicate that the file is uncompressed. The update count for uncompressed state indicates how many times the file, when uncompressed, was updated. The last compression judgment timestamp indicates when compression judgment was performed for the file last time. The compression state, the update count for uncompressed state, and the last compression judgment timestamp are control information to be used by the data compression control unit 37 to achieve efficient data compression of the file. The last compression timestamp indicates when the file was compressed last time by the data compression control unit 37.

Therefore, the file server 10 refers to the control information for performing data compression on each file, as in conventional file systems.

Figure 6:
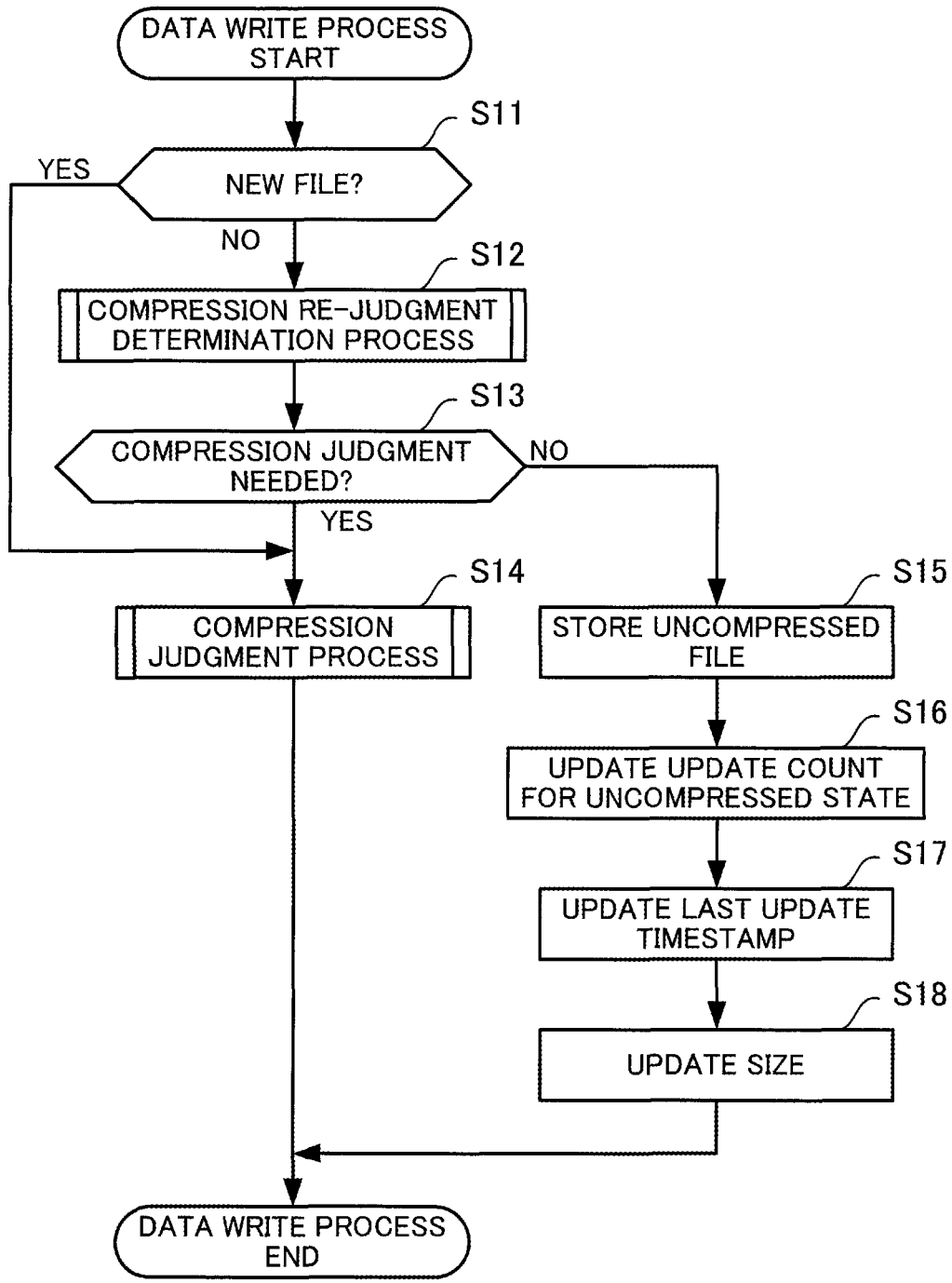
FIG. 6 is a flowchart illustrating a data write process according to the second embodiment.

The following describes a data write process of the second embodiment with reference to FIG. 6. FIG. 6 is a flowchart illustrating a data write process according to the second embodiment.

A data write process is to store data requested to be written, in a compressed format or uncompressed format, in the storage 25. The data write process is initiated when the file server 10 receives a data write request from a host (server 11).

(Step S11) The data compression control unit 37 of the file server 10 determines whether data requested to be written is a new file or not. If the requested data is a new file, the file system control unit 32 proceeds to step S14. If not, the file system control unit 32 proceeds to step S12.

(Step S12) The data compression control unit 37 performs a compression re-judgment determination process. This compression re-judgment determination process is to determine whether to perform a compression judgment process at step S14, which will be described later. That is to say, the compression re-judgment determination process is to determine, based on changes in the state of the file, the timing of re-determining whether data compression is appropriate for the file or not. The compression re-judgment determination process will be described later with reference to FIG. 10.

(Step S13) If the result of the compression re-judgment determination process indicates execution of the compression judgment process (necessity of compression judgment), the data compression control unit 37 proceeds to step S14. If the result of the compression re-judgment determination process indicates non-execution of the compression judgment process, the data compression control unit 37 proceeds to step S15.

(Step S14) The data compression control unit 37 performs the compression judgment process. The compression judgment process is to evaluate the compression effectiveness for the file on the basis of the compressed data of the file, and determine whether the data compression of the file is appropriate or not. If the data compression is determined to be appropriate, the data compression control unit 37 stores the file in a compressed format in the storage 25. If the data compression is determined to be inappropriate, the data compression control unit 37 stores the file in an uncompressed format in the storage 25. The compression judgment process will be described later with reference to FIG. 8. After performing the compression judgment process, the data compression control unit 37 completes the data write process.

(Step S15) The data compression control unit 37 stores the file in an uncompressed format in the storage 25.

(Step S16) The data compression control unit 37 increments, by one, the update count for uncompressed state with respect to the requested file in the file management table 100.

(Step S17) The data compression control unit 37 updates the last update timestamp with respect to the requested file in the file management table 100.

(Step S18) The data compression control unit 37 updates the size with respect to the requested file in the file management table 100, and then completes the data write process.

As described above, the file server 10 evaluates the compression effectiveness for a new file on the basis of the compressed data of the file, and stores the file in a compressed format or uncompressed format in the storage 25. Since the file server 10 evaluates the compression effectiveness for the new file and determines whether the compression of the file is appropriate or not, it is possible to appropriately select files to be compressed, without depending on users, and to reduce the operational burden on users. In addition, the file server 10 stores a file in an uncompressed format in the storage 25 if the compression of the file is evaluated to be ineffective, which reduces wasteful consumption of computing resources.

In addition, the file server 10 provides an opportunity to re-evaluate the compression effectiveness for a file to be updated. This enables the file server 10 to correct the ineffectiveness of file compression according to an environmental change, reduce the operational burden on users, and reduce wasteful consumption of computing resources.

Figure 7:
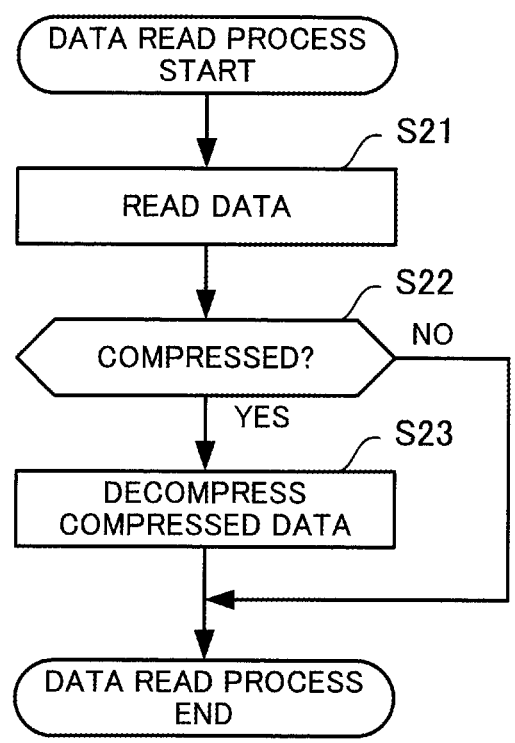
FIG. 7 is a flowchart illustrating a data read process according to the second embodiment.

The following describes a data read process of the second embodiment with reference to FIG. 7. FIG. 7 is a flowchart illustrating a data read process according to the second embodiment.

The data read process is to read requested data from the storage 25, and decompress the data according to necessity. The data read process is initiated when the file server 10 receives a data read request from a host (server 11).

(Step S21) The data compression control unit 37 of the file server 10 reads a requested file from the storage 25.

(Step S22) The data compression control unit 37 determines whether the requested file is compressed or not, with reference to the compression state with respect to the requested file in the file management table 100. If the compression state with respect to the requested file indicates "compressed", the data compression control unit 37 proceeds to step S23. If the compression state with respect to the requested file indicates "uncompressed", the data compression control unit 37 completes the data read process.

(Step S23) Since the requested file is compressed data, the data compression control unit 37 decompresses the compressed data, and then completes the data read process.

As described above, files whose compression is effective are compressed and files whose compression is ineffective are uncompressed, and therefore the file server 10 is able to reduce wasteful consumption of computing resources at data read time.

Figure 8:
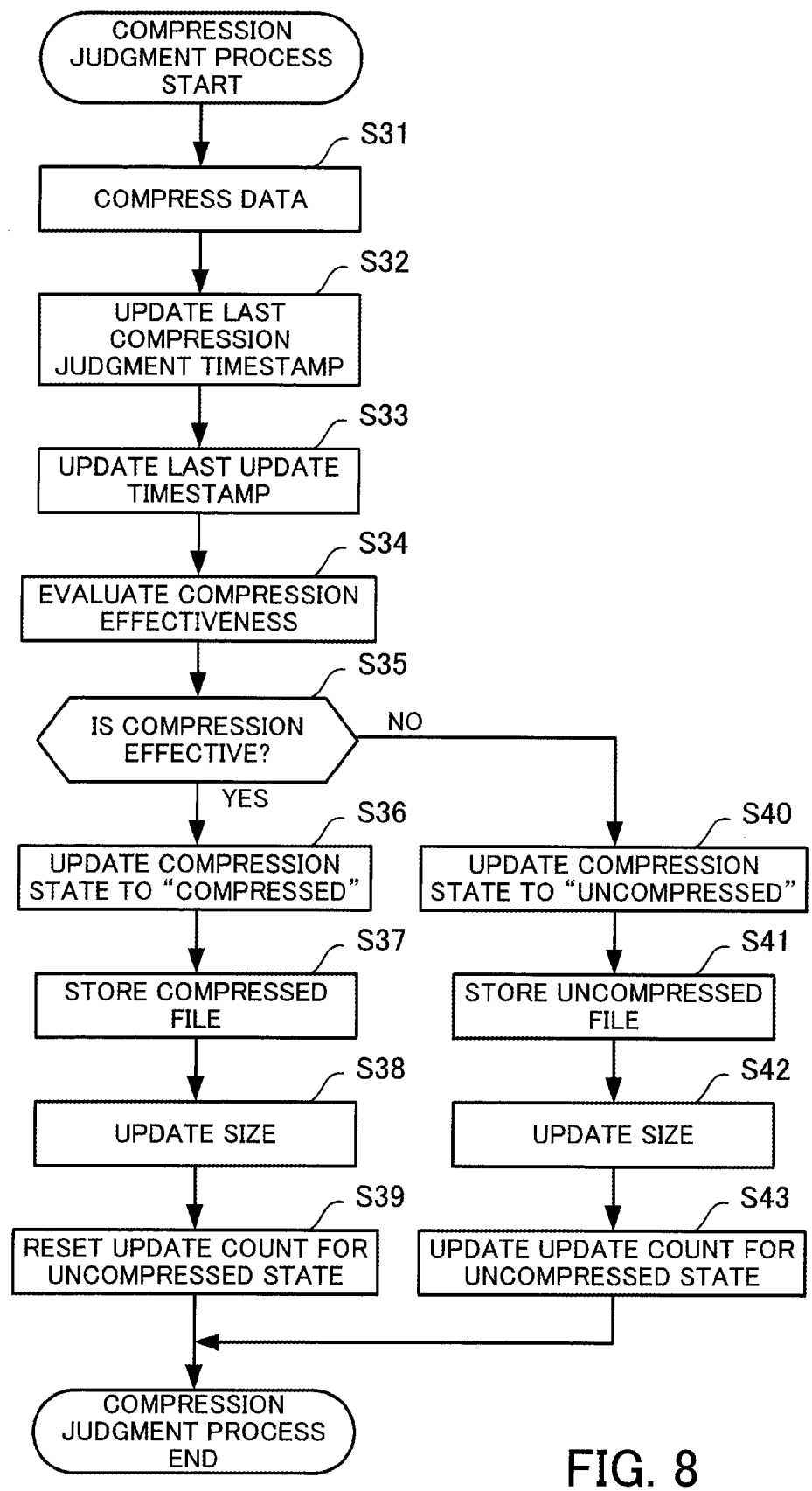
FIG. 8 is a flowchart illustrating a compression judgment process according to the second embodiment.

The following describes the compression judgment process of the second embodiment with reference to FIG. 8. FIG. 8 is a flowchart illustrating a compression judgment process according to the second embodiment.

The compression judgment process is to evaluate the compression effectiveness for a file on the basis of the compressed data of the file and to determine whether the data compression of the file is appropriate or not. If the data compression of the file is determined to be appropriate, the data compression control unit 37 stores the file in a compressed format in the storage 25. If the data compression of the file is determined to be inappropriate, the data compression control unit 37 stores the file in an uncompressed format in the storage 25. The compression judgment process is performed at step S14 of the data write process by the compression judgment unit 38 of the compression control unit 37 in the file server 10.

(Step S31) The compression judgment unit 38 (data compression control unit 37) in the file server 10 performs data compression on a requested file.

(Step S32) The compression judgment unit 38 updates the last compression judgment timestamp with respect to the requested file in the file management table 100.

(Step S33) The compression judgment unit 38 updates the last update timestamp with respect to the requested file in the file management table 100.

(Step S34) The compression judgment unit 38 evaluates the compression effectiveness for the requested file. The compression judgment unit 38 compares, with respect to the requested file, the file size after compression with the file size before compression. Then, the compression judgment unit 38 evaluates that the compression is effective if the file size after compression is smaller than the file size before compression. On the other hand, the compression judgment unit 38 evaluates that the compression is ineffective if the file size after compression is equal to or larger than the file size before compression.

(Step S35) The compression judgment unit 38 determines whether the compression of the requested file is effective or not. If the compression is effective, the compression judgment unit 38 proceeds to step S36. If not, the compression judgment unit 38 proceeds to step S40.

(Step S36) The compression judgment unit 38 updates the compression state with respect to the requested file to "compressed" in the file management table 100.

(Step S37) The compression judgment unit 38 stores the requested file in the compressed format in the storage 25.

(Step S38) The compression judgment unit 38 updates the size with respect to the requested file to indicate the size of the requested file in a compressed format in the file management table 100.

(Step S39) The compression judgment unit 38 resets the update count for uncompressed state with respect to the requested file in the file management table 100, and then completes the compression judgment process.

(Step S40) The compression judgment unit 38 updates the compression state with respect to the requested file to "uncompressed" in the file management table 100.

(Step S41) The compression judgment unit 38 stores the requested file in an uncompressed format in the storage 25.

(Step S42) The compression judgment unit 38 updates the size with respect to the requested file to indicate the size of the requested file in the uncompressed format in the file management table 100.

(Step S43) The compression judgment unit 38 increments, by one, the update count for uncompressed state with respect to the requested file in the file management table 100, and then completes the compression judgment process.

As described above, the file server 10 evaluates the compression effectiveness for a file on the basis of the compressed data of the file, and stores the file in a compressed format in the storage 25 if the compression of the file is evaluated to be effective. Since the file server 10 evaluates the compression effectiveness for the file and determines whether the compression of the file is appropriate or not, it is possible to appropriately select files to be compressed and thus to reduce the operational burden on users. In addition, the file server 10 stores a file in an uncompressed format in the storage 25 if the compression of the file is evaluated to be ineffective, which reduces wasteful consumption of computing resources. In addition, by limiting execution timing for the compression judgment process (to when a new file is written and when execution of compression judgment is determined in the compression re-judgment determination process), the file server 10 is able to reduce wasteful consumption of computing resources that is for evaluating compression effectiveness. In addition, by updating parameters (last compression judgment timestamp, update count for uncompressed state, size, etc.) that are used in the compression re-judgment determination process, the file server 10 is able to appropriately provide an opportunity to re-evaluate compression effectiveness. This enables the file server 10 to correct the ineffectiveness of file compression according to an environmental change, to reduce the operational burden on users, and to reduce wasteful consumption of computing resources.

The following describes a condition table that is used in the second embodiment with reference to FIG. 9. FIG. 9 illustrates an example of a condition table according to the second embodiment.

A condition table 110 is a data table that holds criterion values that are thresholds to be used in comparison with parameters in the compression re-judgment determination process. This condition table 110 is stored in the working memory 22 or non-volatile memory 26.

The condition table 110 contains file update count, elapsed time from last update, file size difference after update, data update amount, elapsed time from last compression, and compression ratio. The update count is a criterion value that is a threshold to be used for comparison with an update count for uncompressed state, and is expressed in units of the number of times. The elapsed time from last update is a criterion value that is a threshold to be used for comparison with an elapsed time from the last update of a file to the present time, and is expressed in units of time. The file size difference after update is a criterion value that is a threshold to be used for comparison with a difference in file size caused by update, and is expressed in units of ratio (ratio in volume). The data update amount is a criterion value that is a threshold to be used for comparison with the data update amount of a file to be updated, and is expressed in units of volume. The elapsed time from last compression is a criterion value that is a threshold to be used for comparison with an elapsed time from the last compression of a file to the present time, and is expressed in units of time. The compression ratio is a criterion value that is a threshold to be used for comparison with the compression ratio of the size of a compressed file, and is expressed in units of ratio.

In this connection, those thresholds are set by default in the condition table 110. However, the thresholds are changeable according to the user's operating environment.

Figure 10:
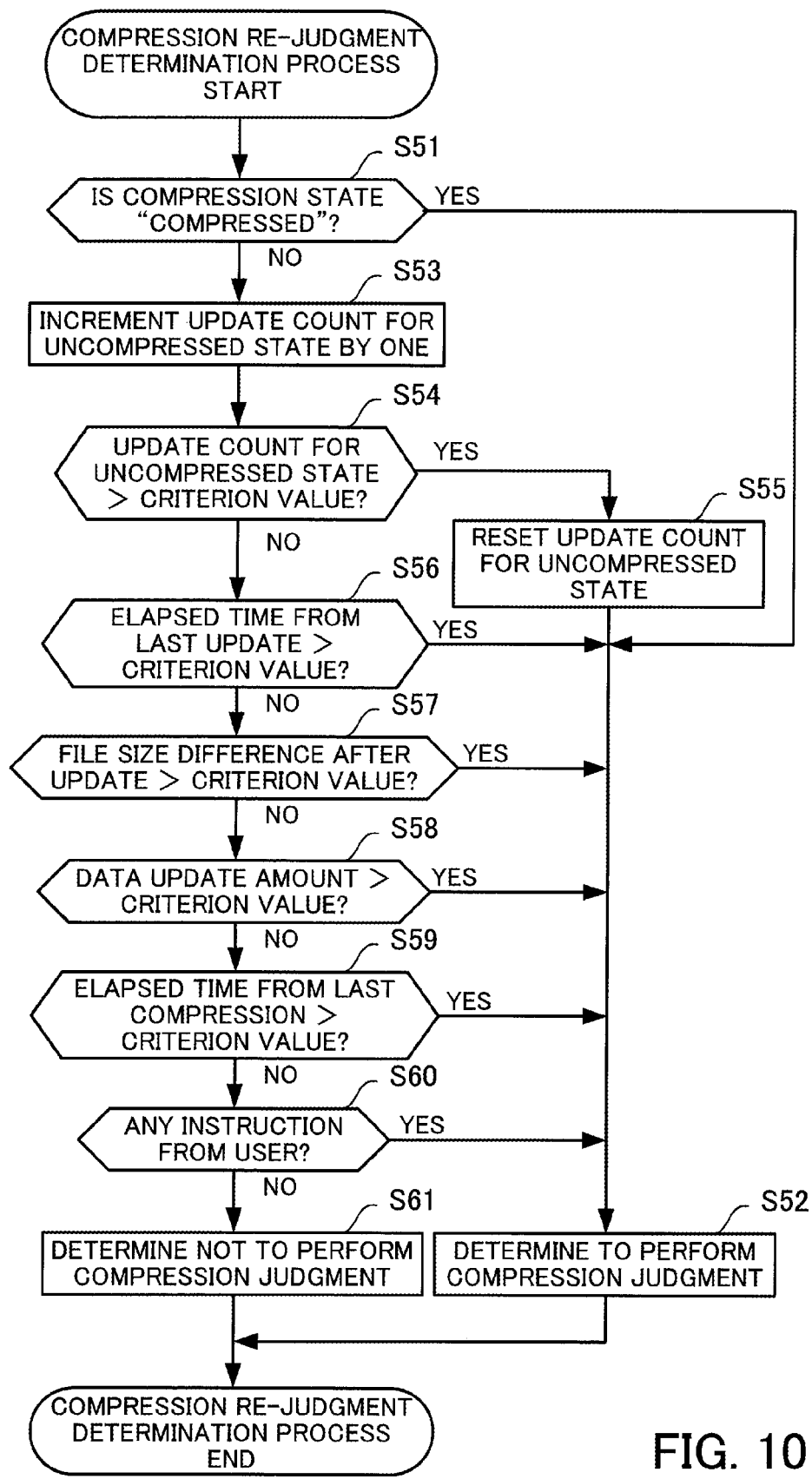
FIG. 10 is a flowchart illustrating a compression re-judgment determination process according to the second embodiment.

The following describes the compression re-judgment determination process using the criterion values held in the condition table 110, with reference to FIG. 10. FIG. 10 is a flowchart illustrating a compression re-judgment determination process according to the second embodiment. The compression re-judgment determination process is to determine, based on changes in the state of a file, the timing of re-determining whether data compression is appropriate for the file or not (to detect the execution timing for the compression judgment process), i.e., to determine whether to perform the compression judgment process or not. The compression re-judgment determination process is performed at step S12 of the data write process by the compression re-judgment determination unit 40 of the data compression control unit 37 in the file server 10.

(Step S51) The compression re-judgment determination unit 40 determines whether a requested file is compressed or not, with reference to the compression state with respect to the requested file in the file management table 100. If the compression state with respect to the requested file indicates "compressed", the compression re-judgment determination unit 40 proceeds to step S52. If the compression state with respect to the requested file indicates "uncompressed", the compression re-judgment determination unit 40 proceeds to step S53.

(Step S52) The compression re-judgment determination unit 40 determines to perform the compression judgment process, and then completes the compression re-judgment determination process.

(Step S53) The compression re-judgment determination unit 40 increments, by one, the update count for uncompressed state with respect to the requested file in the file management table 100.

(Step S54) The compression re-judgment determination unit 40 obtains the update count for uncompressed state (management information) with respect to the requested file from the file management table 100 and the update count (criterion value) from the condition table 110, and makes a comparison therebetween. If the following inequality is satisfied: the update count for uncompressed state (management information)>the update count (criterion value), the compression re-judgment determination unit 40 proceeds to step S55. If the following inequality is satisfied: the update count for uncompressed state (management information) ≤the update count (criterion value), the compression re-judgment determination unit 40 proceeds to step S56. The comparison of the update count for uncompressed state (management information) with the update count (criterion value), performed by the comparison re-judgment determination unit 40, is equivalent to evaluating the update count of the file to be updated.

(Step S55) The compression re-judgment determination unit 40 resets the update count for uncompressed state with respect to the requested file in the file management table 100, and then proceeds to step S52.

(Step S56) The compression re-judgment determination unit 40 obtains the last update timestamp (management information) with respect to the requested file from the file management table 100, the elapsed time from last update (criterion value) from the condition table 110, and the present time. If the following inequality is satisfied: an elapsed time from last update (i.e., the present time−the last update timestamp (management information))>the elapsed time from last update (criterion value), the compression re-judgment determination unit 40 proceeds to step S52. If the following inequality is satisfied: the elapsed time from last update (i.e., the present time−the last update timestamp (management information))≤the elapsed time from last update (criterion value), the compression re-judgment determination unit 40 proceeds to step S57. The comparison of the elapsed time from last update (i.e., the present time−the last update timestamp (management information)) with the elapsed time from last update (criterion value), performed by the comparison re-judgment determination unit 40, is equivalent to evaluating the elapsed time from last update with respect to the file to be updated.

(Step S57) The compression re-judgment determination unit 40 obtains the size (management information) with respect to the requested file from the file management table 100 and the file size difference after update (criterion value) from the condition table 110. If the following inequality is satisfied: {the size of the requested file after update (management information)−the size of the requested file before update}/the size of the requested file before update>the file size difference after update (criterion value), the compression re-judgment determination unit 40 proceeds to step S52. If the following inequality is satisfied: {the size of the requested file after update (management information)−the size of the requested file before update}/the size of the requested file before update≤the file size difference after update (criterion value), the compression re-judgment determination unit 40 proceeds to step S58. The comparison of {the size of the requested file after update (management information)−the size of the requested file before update}/the size of the requested file before update with the file size difference after update (criterion value), performed by the compression re-judgment determination unit 40, is equivalent to evaluating the difference in file size of the file to be updated between before and after update.

(Step S58) The compression re-judgment determination unit 40 obtains the size (management information) with respect to the requested file from the file management table 100 and the data update amount (criterion value) from the condition table 110. If the following inequality is satisfied: the size of the requested file after update (management information)−the size of the requested file before update>the data update amount (criterion value), the compression re-judgment determination unit 40 proceeds to step S52. If the following inequality is satisfied: the size of the requested file after update (management information)−the size of the requested file before update≤the data update amount (criterion value), the compression re-judgment determination unit 40 proceeds to step S59. This comparison of the size of the requested file after update (management information)−the size of the requested file before update with the data update amount (criterion value), performed by the compression re-judgment determination unit 40, is equivalent to evaluating the data update amount of the file to be updated.

(Step S59) The compression re-judgment determination unit 40 obtains the last compression timestamp (management information) with respect to the requested file from the file management table 100, the elapsed time from last compression (criterion value) from the condition table 110, and the present time. If the following inequality is satisfied: an elapsed time from last compression (i.e., the present time−the last compression timestamp (management information))>the elapsed time from last compression (criterion value), the compression re-judgment determination unit 40 proceeds to step S52. If the following inequality is satisfied: the elapsed time from last compression (i.e., the present time−the last compression timestamp (management information))≤the elapsed time from last compression (criterion value), the compression re-judgment determination unit 40 proceeds to step S60. This comparison of the elapsed time from last compression (i.e., the present time−the last compression timestamp (management information)) with the elapsed time from last compression (criterion value), performed by the compression re-judgment determination unit 40, is equivalent to evaluating the elapsed time from last compression with respect to the file to be updated.

(Step S60) The compression re-judgment determination unit 40 determines whether there is an instruction for data compression from a user or not. If there is an instruction for data compression from the user, the compression re-judgment determination unit 40 proceeds to step S52. If not, the compression re-judgment determination unit 40 proceeds to step S61.

In this connection, the file server 10 may receive the instruction for data compression together with a data write instruction from the user, or may receive a reservation for the data compression in advance through setting or the like.

(Step S61) The compression re-judgment determination unit 40 determines not to perform the compression judgment process, and then completes the compression re-judgment determination process.

As described above, the file server 10 detects execution timing for the compression judgment process according to changes in a requested file. Therefore, the file server 10 reduces wasteful consumption of computing resources due to the compression judgment process that is performed each time the requested file is updated. Further, the file server 10 prevents inefficient operation of the storage 25 due to failing to detect changes made to the requested file by updates. Still further, the file server 10 is able to achieve efficient use of the storage 25 and computing resources with reducing the operational burden on users. Still further, the file server 10 is able to perform setting appropriate for the user's operating environment by managing the condition table 110.

(c) Modification Example of Second Embodiment

In the compression judgment process of the second embodiment, the compression judgment unit 38 compares, with respect to a requested file, the file size before compression with the file size after compression. Then, if the file size after compression is smaller than the file size before compression, the compression judgment unit 38 evaluates that the compression is effective.

This modification example of the second embodiment has a different feature in that if a file size after compression is smaller than a file size before compression but the compression ratio does not reach a compression ratio set in the condition table 110, the compression is evaluated to be ineffective.

Therefore, in the modification example of the second embodiment, the compression judgment unit 38 evaluates compression effectiveness by further comparing the size of a requested file after compression/the size of the requested file before compression with a compression ratio (criterion value). More specifically, if the following inequality is satisfied: the file size after compression/the file size before compression<the compression ratio (criterion value), the compression judgment unit 38 evaluates that the compression is effective. On the other hand, if the following inequality is satisfied: the file size after compression/the file size before compression the compression ratio (criterion value), the compression judgment unit 38 evaluates that the compression is ineffective.

This enables the file server 10 to achieve more efficient use of the storage 25 and computing resources. When the storage 25 has sufficient free space, efficient use of the storage 25 is less demanded. Therefore, the file server 10 may put more emphasis on the effective use of computing resources and set a compression ratio (criterion value) that requests high compression effectiveness. On the other hand, when the storage 25 has insufficient free space, efficient use of the storage 25 is more demanded. Therefore, the file server 10 may put less emphasis on the effective use of computing resources and set a compression ratio (criterion value) that requests low compression effectiveness. In addition, when there are sufficient computing resources, the file server 10 may put less emphasis on the effective use of the computing resources and set a compression ratio (criterion value) that requests low compression effectiveness. On the other hand, when computing resources are insufficient, the file server 10 may put emphasis on the effective use of the computing resources and set a compression ratio (criterion value) that requests high compression effectiveness.

The above description has exemplified the storage apparatus 1 and file system 10. Alternatively, other information processing apparatuses may be employed. In addition, the storage control unit 24 may be configured to perform the compression control, by itself or in cooperation with the processor 20 of the file server 10.

In this connection, the above-described processing functions may be realized by using a computer. In this case, a program that describes the processing contents of the functions that the storage apparatus 1, file server 10, or storage control unit 24 needs to have is provided. By executing the program, the computer implements the processing functions. The program, which describes the processing contents, may be recorded on a computer-readable recording medium. Computer-readable recording media include magnetic storage devices, optical discs, magneto-optical recording media, semiconductor memories, and so on. The magnetic storage devices include Hard Disk Drives (HDDs), Flexible Disks (FDs), Magnetic Tapes, etc. The optical discs include DVDs, and DVD-RAMS, CD-ROMs, CD-RWs, etc. The magneto-optical recording media include Magneto-Optical discs (MOs), etc.

To distribute the program, portable recording media such as DVDs, CD-ROMs, and so on, on which the program is recorded, may be put on sale. Alternatively, the program may be stored in the storage device of a server computer and may be transferred from the server computer to another computer over a network.

The computer, which runs the program, stores in its local storage device the program recorded on a portable recording medium or transferred from the server computer, for example. The computer reads the program from the local storage device, and then performs processing according to the program. The computer may run the program directly from the portable recording medium, and perform processing according to the program. Also, while receiving the program being transferred from the server computer over a network, the computer may sequentially run this program.

In addition, the above-described processing functions may also be implemented wholly or partly by using a DSP, ASIC, PLD, or other electronic circuits.

According to one aspect, a storage apparatus and data compression method achieve data compression with reducing the operational burden and using computing resources efficiently.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A storage apparatus comprising:
a data storage device configured to store data of a file in an uncompressed format;
a memory configured to store management information about the file, the management information including an update count of the file in the uncompressed format; and
a processor coupled to the memory and the data storage device, the processor configured to perform a procedure including:
making a judgment about whether to compress the file stored in the uncompressed format by evaluating compression effectiveness for the file and determining whether compression of the file is appropriate or not, incrementing the update count each time a write is performed on data of the file stored in the uncompressed format, resetting the update count when the file is stored in the compressed format, and when the update count of the file in the uncompressed format exceeds a predetermined threshold, making a re-judgment about whether to compress the file stored in the uncompressed format in the data storage device, by re-evaluating compression effectiveness for the file and determining whether compression of the file is appropriate or not, and
updating the management information so as to reflect a result of the re-judgment, storing compressed data of the file in a compressed format in the data storage device when the result of the re-judgment indicates that the compression of the file is appropriate, and leaving the file in the uncompressed format when the result of the re-judgment indicates that the compression of the file is inappropriate.

2. The storage apparatus according to claim 1, wherein the judgment is performed when data of a new file is stored in the data storage device.

3. The storage apparatus according to claim 1, wherein:
the management information further includes an update timestamp of the file; and
the re-judgment is also performed based on a comparison of an elapsed time from the update timestamp with a criterion value that is set in advance.

4. The storage apparatus according to claim 1, wherein:
the management information further includes a size of the file; and
the re-judgment is also performed based on a comparison of a size difference of the file between before and after update with a criterion value that is set in advance.

5. The storage apparatus according to claim 1, wherein:
the management information further includes a size of the file; and
the re-judgment is also performed based on a comparison of the size of the file with a criterion value that is set in advance.

6. The storage apparatus according to claim 1, wherein:
the management information further includes a compression timestamp of the file; and
the re-judgment is also performed based on a comparison of an elapsed time from the compression timestamp with a criterion value that is set in advance.

7. The storage apparatus according to claim 1, wherein the judgment compares, with respect to the file, a file size before the compression with a file size after the compression, and upon detecting that a ratio of the file size after the compression to the file size before the compression reaches a compression ratio that is set in advance, determines that the compression is effective.

8. The storage apparatus according to claim 1, wherein the judgment compares, with respect to the file, a file size before the compression with the file size after the compression, and upon detecting that the file size after the compression is smaller than the file size before the compression, determines that the compression is effective.

9. The storage apparatus according to claim 1, wherein the procedure further includes:
obtaining, upon receiving a request for accessing the file, the result of the re-judgment from the management information and the data from the data storage device, and
decompressing the data upon detecting that the result of the re-judgment indicates that the compression of the file is appropriate.

10. A data compression method executed by a computer including a data storage device configured to store data of a file and a memory configured to store an update count of the file, the data compression method comprising:

making a judgment about whether to compress the file stored in the uncompressed format by evaluating compression effectiveness for the file and determining whether compression of the file is appropriate or not, incrementing the update count each time a write is performed on data of the file stored in the uncompressed format, resetting the update count when the file is stored in the compressed format, and when the update count of the file in the uncompressed format exceeds a predetermined threshold, making a re-judgment about whether to compress the file stored in the uncompressed format in the data storage device, by re-evaluating compression effectiveness for the file and determining whether compression of the file is appropriate or not; and updating the management information so as to reflect a result of the re-judgment, storing compressed data of the file in a compressed format in the data storage device when the result of the re-judgment indicates that the compression of the file is appropriate, and leaving the file in the uncompressed format when the result of the re-judgment indicates that the compression of the file is inappropriate.

* * * * *